US012253726B2

(12) United States Patent
Foelling (10) Patent No.: US 12,253,726 B2
(45) Date of Patent: Mar. 18, 2025

(54) SYSTEM AND METHOD FOR COUPLING AN OPTICAL BEAM INTO A LIGHT RECEIVER

(71) Applicant: LEICA MICROSYSTEMS CMS GMBH, Wetzlar (DE)

(72) Inventor: Jonas Foelling, Freiburg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 265 days.

(21) Appl. No.: 17/918,348

(22) PCT Filed: Mar. 29, 2021

(86) PCT No.: PCT/EP2021/058186
§ 371 (c)(1),
(2) Date: Oct. 12, 2022

(87) PCT Pub. No.: WO2021/209252
PCT Pub. Date: Oct. 21, 2021

(65) Prior Publication Data
US 2023/0147321 A1    May 11, 2023

(30) Foreign Application Priority Data
Apr. 16, 2020 (EP) .................................... 20169840

(51) Int. Cl.
*G02B 6/42* (2006.01)
(52) U.S. Cl.
CPC .................. *G02B 6/4214* (2013.01)
(58) Field of Classification Search
CPC .................. G02B 6/42; G02B 6/4214
See application file for complete search history.

(56) References Cited

U.S. PATENT DOCUMENTS

| 6,516,115 B1 | 2/2003 | Fujita et al. |
| 10,775,571 B2 | 9/2020 | Kasai |

(Continued)

FOREIGN PATENT DOCUMENTS

| EP | 1241501 A1 | 9/2002 |
| JP | 2010/211164 A | 9/2010 |

(Continued)

OTHER PUBLICATIONS

Ghasemi, S.H. et al.; "High Brightness Fiber-Coupling Technique for High Power Diode Laser Bars"; 2011 *Symposium on Photonics and Optoelectronics* (SOPO); May 31, 2011; pp. 1-3; IEEE; Piscataway, NJ, USA.

*Primary Examiner* — Tina M Wong
(74) *Attorney, Agent, or Firm* — LEYDIG, VOIT & MAYER, LTD.

(57) ABSTRACT

A system for coupling at least one optical beam includes at least one optical beam entry port, an optical beam exit port, the optical beam exit port including a lens performing a Fourier Transform, at least one optical beam deflector, and an optical base element, wherein the at least one directly fixed optical beam deflector is allowed to rotate around a rotation axis, wherein the corresponding at least one optical beam and/or its assigned optical beam entry port is configured such that the semi-major axis of the elliptical cross section of the optical beam on a deflection surface of a respective optical beam deflector is oriented parallel to the rotation axis, and wherein, after having passed the optical beam exit port, the elliptical cross section of the at least one optical beam overlaps the circular cross section of the light receiver.

14 Claims, 7 Drawing Sheets

(56) References Cited

U.S. PATENT DOCUMENTS

| | | |
|---|---|---|
| 2009/0060518 A1 | 3/2009 | Wang |
| 2009/0245315 A1 | 10/2009 | Faybishenko |
| 2019/0020178 A1 | 1/2019 | Oguri et al. |
| 2019/0030641 A1* | 1/2019 | Nagayasu ............ G02B 6/4214 |
| 2019/0191979 A1* | 6/2019 | Roichman .......... G01N 21/6458 |

FOREIGN PATENT DOCUMENTS

| | | |
|---|---|---|
| JP | 2011/025279 A | 2/2011 |
| JP | 2018/155791 A | 10/2018 |
| WO | 98/47036 A1 | 10/1998 |
| WO | WO 2014/119353 A1 | 8/2014 |
| WO | 2017/134911 A1 | 8/2017 |

* cited by examiner

SYSTEM AND METHOD FOR COUPLING AN OPTICAL BEAM INTO A LIGHT RECEIVER

CROSS REFERENCE TO RELATED APPLICATIONS

This application is a U.S. National Phase application under 35 U.S.C. § 371 of International Application No. PCT/EP2021/058186, filed on Mar. 29, 2021, and claims benefit to European Patent Application No. EP 20169840.4, filed on Apr. 16, 2020. The International Application was published in English on Oct. 21, 2021 as WO 2021/209252 A1 under PCT Article 21(2).

FIELD

The present invention is directed to a system and a method for coupling an optical beam into a light receiver, particularly for coupling at least one optical beam, each having an essentially or exactly elliptical beam cross section into a light receiver having an essentially or exactly circular light receiving cross section.

BACKGROUND

In many applications, an optical beam generated by a laser, such as a semiconductor laser or a laser diode, needs to be coupled into a light receiver, such as an optical fibre. It is often necessary to couple more than only one optical beam into such a light receiver. For example, for many microscopy applications, such as laser scanning techniques, it is advantageous to deliver light including multiple laser lines to the microscope itself via a single-mode optical fibre. In such cases, the stability of the laser light power at the end of the optical fibre is very important. Due to the small fibre core diameters of single-mode fibres of only several microns, fibre coupling needs an accurate alignment of the corresponding optical elements directing and deflecting the optical beam(s) to the optical fibre. If several laser lines are involved, the beams are typically merged onto the same beam path using dichroic mirrors. Such a dichroic mirror allows a first beam to pass through the dichroic mirror while deflecting a second beam such that both beams will then propagate in the same direction and preferably co-axially.

For such applications, typically a system is used comprising mirrors/dichroic mirrors (also herein referred to as "optical beam deflectors") for deflecting the one or more optical beams onto the same path of propagation leading to the light receiver/optical fibre. Usually, the necessary accurate alignment of the optical beams is done using precise opto-mechanics having a mirror fixed thereon by an adhesive or by a locking screw. Such mirror holders comprise a three-point bearing where at least two supporting points can be moved back and forth, e.g. by screws with a fine thread. Thus, the vertical and horizontal tilt can be set independently. State-of-the-art mirror holders can be moved very precisely and are very suitable for fibre coupling. Additionally, the mechanics can often be locked, leading to a quite good long-term-stability. There are, however, some drawbacks involved using such mirror holders. First, they are quite expensive, second, the achieved alignment of beams has to be stable in the long term in order to ensure laser power stability at the fibre end, increasing the demands on the opto-mechanics even more. Finally, typically a user has to align the mirrors for the desired coupling purposes, which is a time consuming procedure. Mirror holders or opto-mechanics of that kind are referred to in the following as "adjustment devices".

Nowadays, laser diodes are typically used as compact and mostly cost-efficient sources of laser light. They have, however, a significant disadvantage in combination with fibre-coupling. After collimation, the laser beam has an elliptical shape/beam cross section, while single-mode fibres show a circular symmetric core, which means that the TEM00-mode coupling into the optical fibre is also circular. The result is that the coupling efficiencies of laser diodes into fibres are not that good due to the fact that a significant part of the elliptical laser beam focus can not couple into the circular fibre core.

The standard solution to solve this problem is beam-shaping, i.e. transforming the elliptical laser beam into a circular beam, by using e.g. an anamorphotic prism pair or cylindrical lenses. This increases the complexity and the price of the optical system, which is again disadvantageous.

SUMMARY

In an embodiment, the present disclosure provides a system for coupling at least one optical beam, each having an essentially or exactly elliptical beam cross section into a light receiver having an essentially or exactly circular light receiving cross section, the system comprising at least one optical beam entry port, each configured to provide an entry for each of the at least one optical beams into the system, an optical beam exit port configured to provide an exit for the at least one optical beam out of the system for coupling the at least one optical beam into the light receiver, the optical beam exit port comprising a lens configure to perform a Fourier Transform, at least one optical beam deflector for deflection of an optical beam of the at least one optical beam, and an optical base element, at least one of the at least one beam deflectors being directly fixed to the base element, wherein due to being fixed, the at least one directly fixed optical beam deflector is allowed to rotate around a rotation axis which rotation results in an additional deflection of the corresponding optical beam, wherein the corresponding at least one optical beam and/or its assigned optical beam entry port is further configured such that the semi-major axis of the elliptical cross section of the optical beam on a deflection surface of a respective optical beam deflector is oriented essentially or exactly parallel to the rotation axis, and wherein the at least one optical beam deflector is oriented such that, after having passed the optical beam exit port, the elliptical cross section of the at least one optical beam overlaps the circular cross section of the light receiver.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In view of the problems described above, there is a need for an improved beam coupling system and a corresponding method, particularly reducing the necessity for ultra-stable opto-mechanics.

Embodiments of the present invention provide a system for coupling at least one optical beam, each having an essentially or exactly elliptical beam cross section, such as one or more optical beams generated by respective semiconductor lasers or laser diodes, into a light receiver, such as an optical fibre, having an essentially or exactly circular light receiving cross section, wherein the system comprises at least one optical beam entry port, each port being configured to provide an entry for each of the at least one optical beam into the system, an optical beam exit port configured to provide an exit for the at least one optical beam out of the system for coupling the at least one optical beam into the light receiver, at least one optical beam deflector, such as a mirror and/or dichroic mirror, for deflection of an optical beam of the at least one optical beam, and an optical base element, such as an optical base plate extending in an (x-y-) plane of the system. In this system, at least one beam deflector of said at least one beam deflector is directly, in other words unintermediately, particularly without using any adjustment device such as the above opto-mechanics or holder, fixed to the base element. Particularly, no adjustment of the thus fixed beam deflector after its fixation is possible. Due to the fixation, especially during or even after the fixation, as will be explained in more detail below, a directly fixed beam deflector typically might rotate—within a small rotation angle range—around a rotation axis which rotation results in an additional deflection of the corresponding optical beam. This "additional" deflection occurs in addition to the normal desired deflection. In this system, the at least one optical beam entry port and/or the at least one optical beam is further configured such that the semi-major axis of the elliptical cross section of the respective optical beam on a deflection surface of the beam deflector is oriented essentially or exactly parallel to the rotation axis. Finally, in this system, the at least one optical beam deflector is oriented such that after having passed the optical beam exit port or at the vicinity of the optical beam exit port, the elliptical cross section of the at least one optical beam overlaps the circular cross section of the light receiver.

Hitherto, in commercial coupling systems, each deflection element/optical beam deflector or at least the one located immediately before the optical beam exit port is delivered with its own opto-mechanics/adjustment device, increasing the costs of the system. It would be advantageous and more user friendly to align the mirrors in a factory, e.g. using special opto-mechanics, and then after having fixed the mirrors to the system release them from the opto-mechanics, which latter can then be used for the production of another system. Embodiments of the present invention achieve this very advantage. A single, some or even all beam deflectors used in the system can be directly fixed onto the base element of the system without delivering corresponding opto-mechanics to the user of the system.

Further, embodiments of the present invention overcome the problems related to the fixing of a mirror to the base element/plate of the system. One could think, for example, of fixing the mirror with some kind of screw or by simply using an adhesive. Each of these processes will unfortunately move the mirror a little bit while fixing it. A screw typically induces a little movement on the mirror while fastening it. On the other hand, an adhesive tends to shrink while hardening and will thus move the mirror. Further, with thermal changes of the environment, adhesives tend to shrink or expand, thus resulting in thermally induced movements of the mirror after its fixation, which can influence the coupling efficiency. Further, there are different ways of fixing a mirror to the base element/plate. The backside of the mirror can be fixed to a holder connected to the base element. Another way would be fixing the mirror with a lateral surface at one of its sides directly to the base element. The fixing could be done by an adhesive. During hardening of the adhesive and later on due to thermal fluctuations, the adhesive moves, moving the mirror and thus leading to different angular orientations. This would typically render the time consuming and cumbersome alignment process void.

In an embodiment, the present invention solves this problem as described in the following disclosure.

The idea of orienting the elliptical cross section of an optical beam in the way described above makes use of the supposed disadvantage of an elliptical beam cross section in order to compensate mirror movements related to a direct fixing of a mirror to the base element. This is described in the following with reference to FIG. 3.

Figure 2:
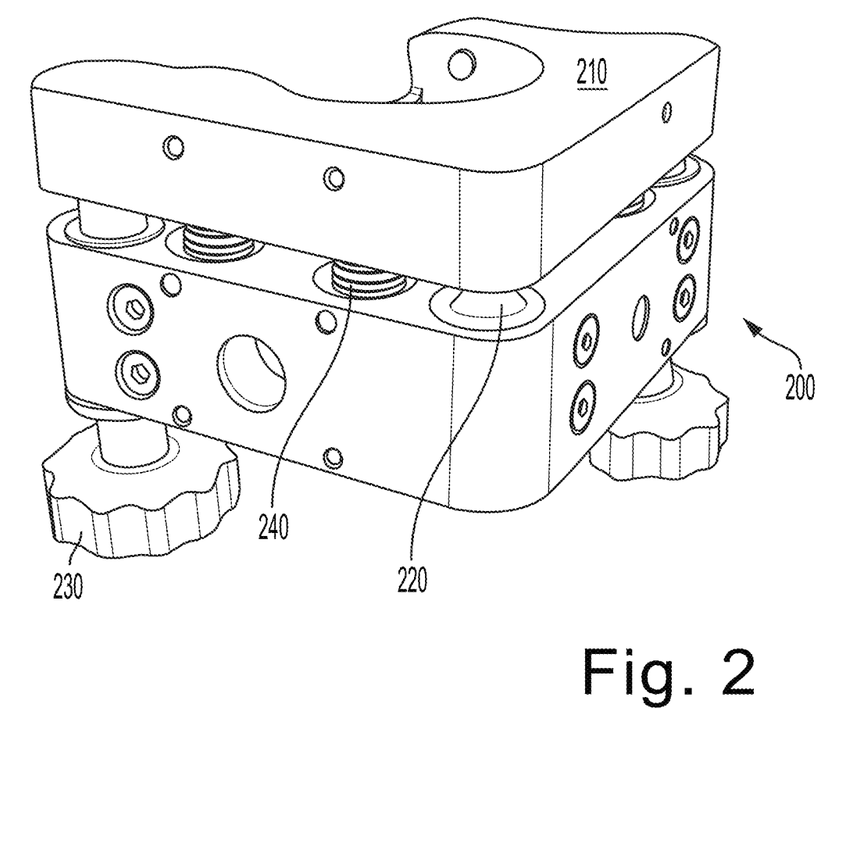
FIG. 2 shows an example of a state-of-the-art opto-mechanical mirror holder.
Figure 3A:
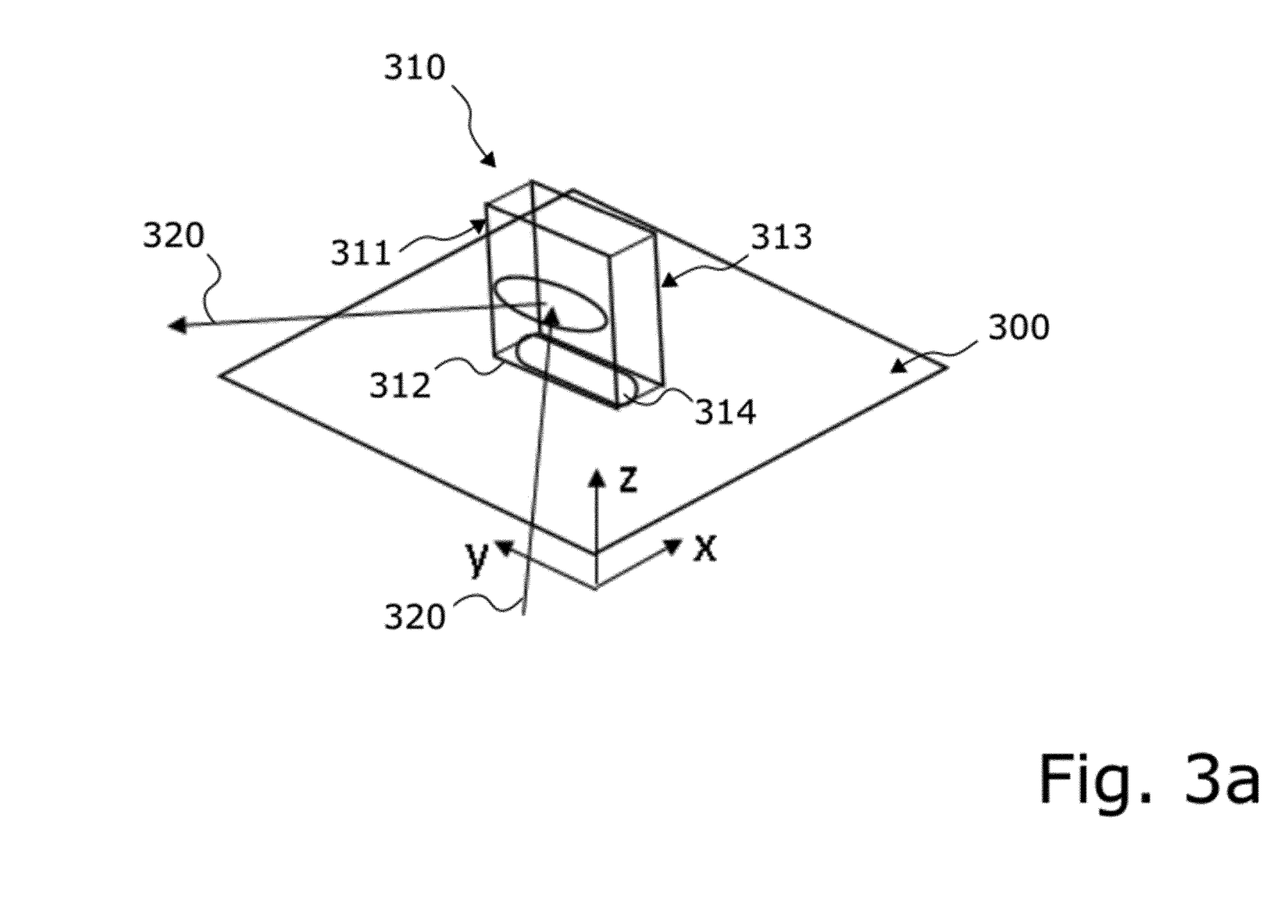
FIGS. 3a-3d schematically show an optical beam deflector directly fixed to a base element as used in a system according to an embodiment of the present invention.

FIG. 3a schematically shows a beam deflector/mirror 310 directly fixed via an adhesive 314 onto a base element 300, here a base plate extending in the x-y-plane of the system. The mirror or beam deflector 310 has a deflection surface 311 and a backside 313 opposed to the deflection surface 311, and further four lateral surfaces at the four sides of the mirror 310, the mirror being directly fixed in this embodiment with one of its lateral surfaces 312 via the adhesive 314 to the base element 300. It is noted that "directly" or "unintermediately" in the context of fixing a beam deflector to the base element is especially to be understood in the meaning of fixing the beam deflector without an adjustment device allowing free adjustment of the beam deflector after its fixation. Such a "direct" fixing, however, does not exclude that the beam deflector can be fitted onto a holder or into a frame, e.g. irreversibly, or that the beam deflector and the holder/frame are a compound unit acting as a unibody component, and the holder/frame can be fixed to the base element. The fixing itself can be done via an adhesive and/or with the help of at least one screw and/or welding or other fixing means. Again, it is noted that the fixing is particularly done without using any kind of adjustable holders or opto-mechanics as shown in FIG. 2 by means of which the beam deflector would be indirectly fixed to the base element.

FIG. 3a further shows an optical beam 320 such as a laser beam travelling in an x-y-plane and being reflected by a deflection surface 311 of the mirror 310. The illuminated area on the deflecting surface 311 is also shown. The arrows 320 denote the propagation direction of the laser beam, not the beam shape.

Figure 3B:
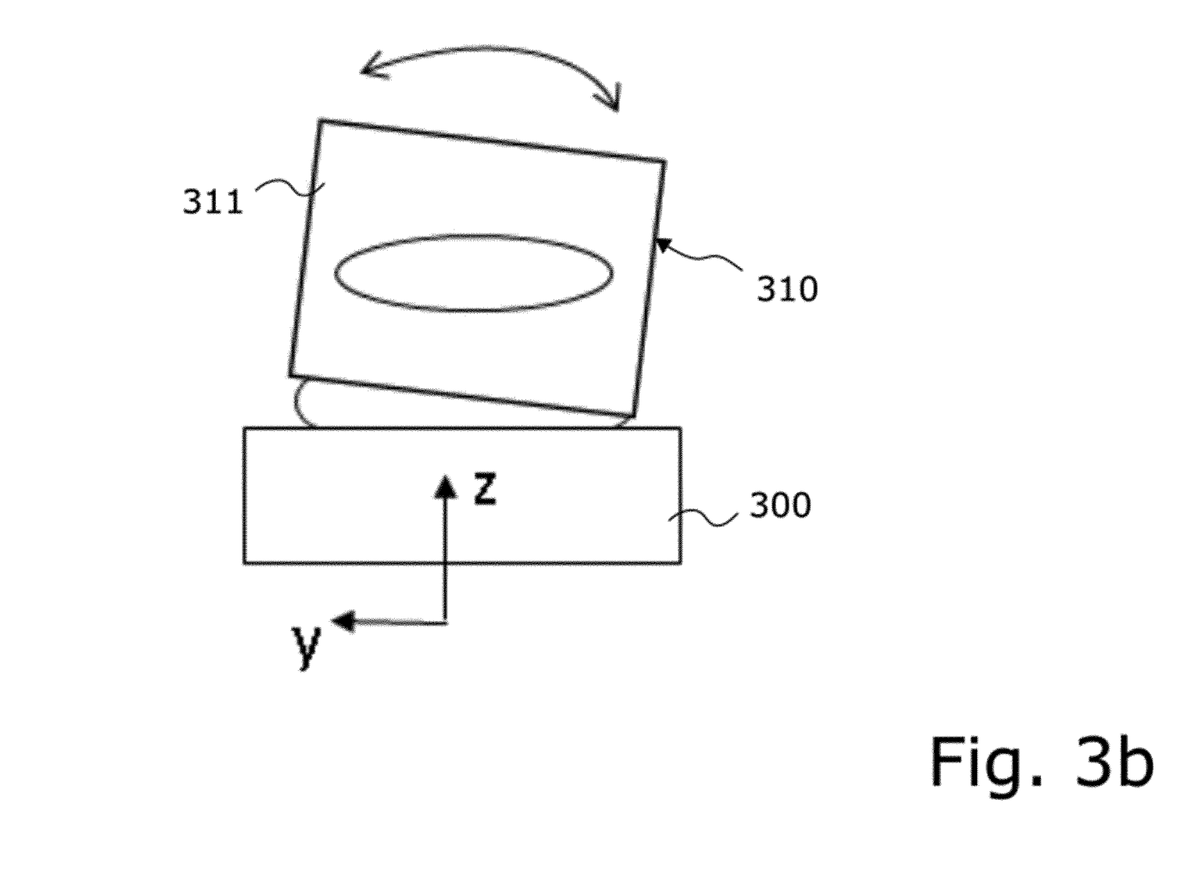

Fixing the mirror 310 by a layer of adhesive 314 to the base element 300, the adhesive will typically create a layer between the lateral surface 312 and the base plate 300, which layer is never really perfectly uniform, but could, for example, be in the form of a slight wedge. This wedge of adhesive will lead to a rotation of the mirror 310 around an axis parallel to the x-axis upon shrinkage or expansion of the wedge due to hardening or thermal changes. This situation is illustrated in FIG. 3b. A rotation of the mirror 310 around an axis parallel to the x-axis, however, does not influence the direction of the reflected beam 320, in other words, does not lead to an "additional" deflection as defined above.

Figure 3C:
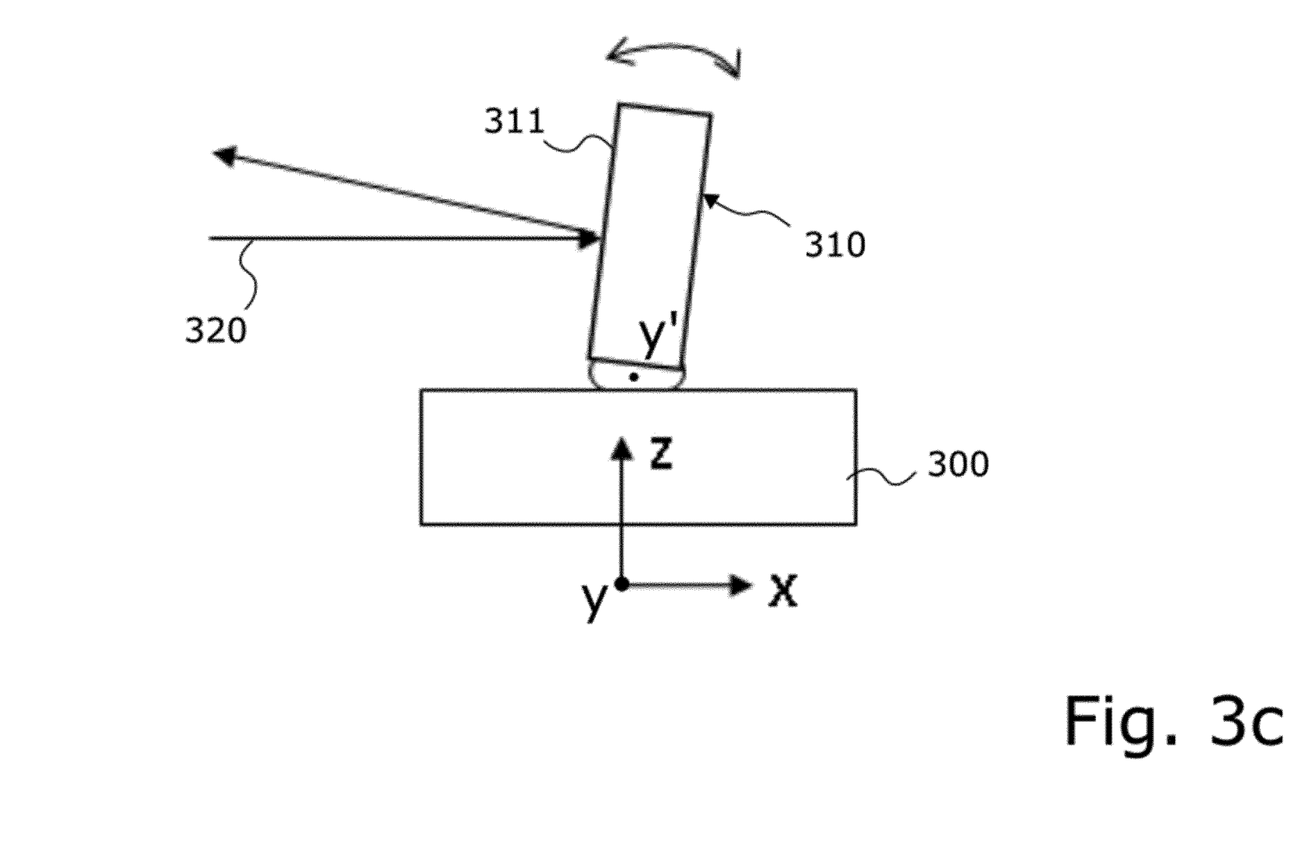

Additionally or alternatively, the wedge of adhesive can be formed as shown in FIG. 3c. Again, during shrinkage or expansion of the adhesive due to hardening of the adhesive or due to thermal changes, the thicker side of the wedge will expand further than the thinner side of the wedge, leading to a tilt or a rotation of the mirror 310 around a rotation axis y' parallel to the y-axis. A movement of the mirror 310 around the y'-axis, however, leads to a deflection of the beam upon reflection out of the x-y-plane as illustrated in FIG. 3c and thus to an additional undesired deflection. As explained below, embodiments of the present invention, however, are to a large extent insensitive to such a deflection of the beam out of the x-y-plane as long as the elliptical cross section overlaps the circular cross section of the light receiver.

As mentioned above, another possibility of fixing the mirror 310 to the base element 300 would be to use a holder which is fixed to the base element, the mirror 310 being fixed with its backside 313 at least partly to such a holder. As can be seen from FIG. 3, such a fixing might lead to a slight rotation of the mirror 310 around an axis parallel to the z-axis upon shrinkage or expansion of the adhesive. In this case, it would have to be made sure that the semi-major axis of the elliptical cross section of the optical beam on the deflection surface 311 is oriented (essentially) parallel to the rotation axis/z-axis.

Figure 3D:
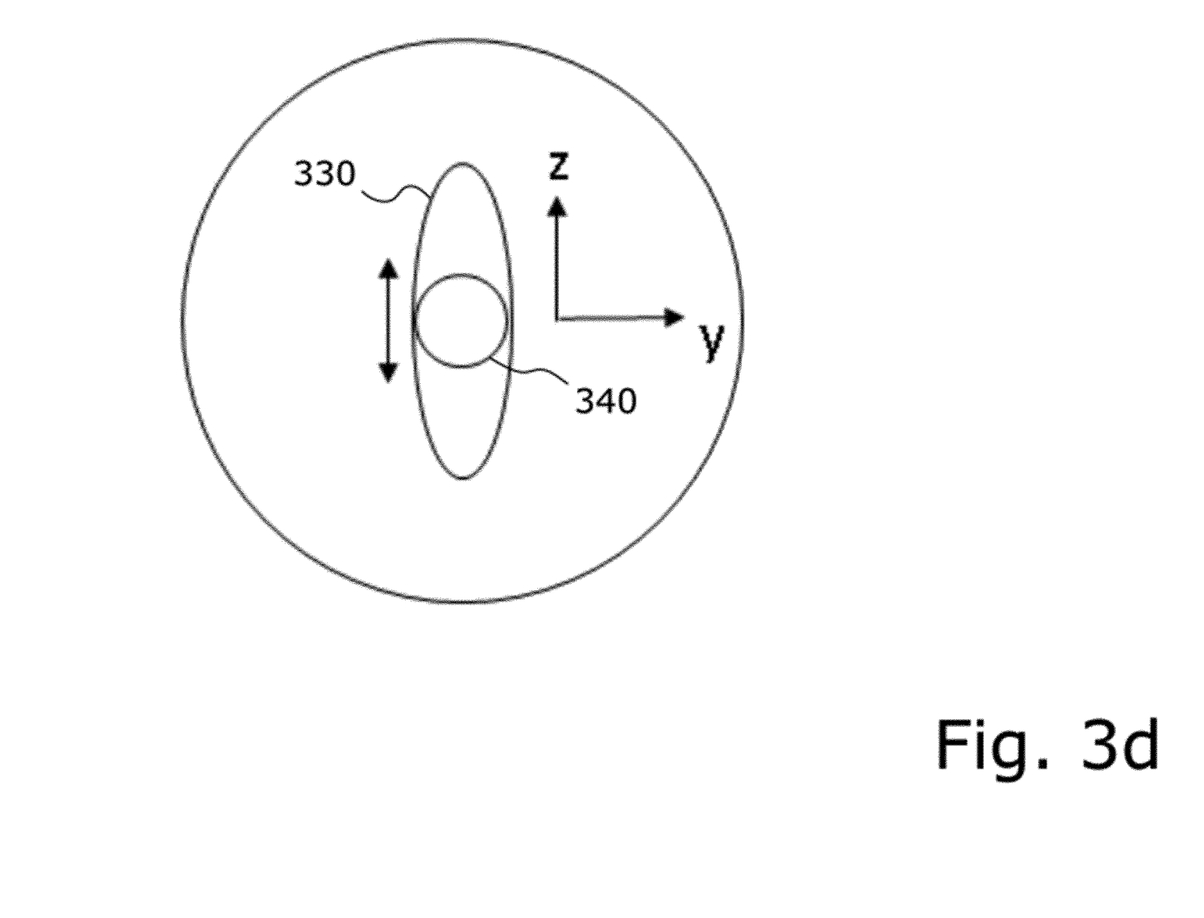

As explained further below in connection with embodiments of the present invention, the situation of FIG. 3c, i.e. a rotation of the mirror 310 around the y'-axis leads to a shift of the elliptical cross section with its semi-major axis along the z-direction as illustrated in FIG. 3d by the arrow next to the elliptical beam cross section 330. Such a shift hardly influences the coupling efficiency as long as the elliptical cross section 330 overlaps the circular cross section 340 of the light receiver.

Figure 1:
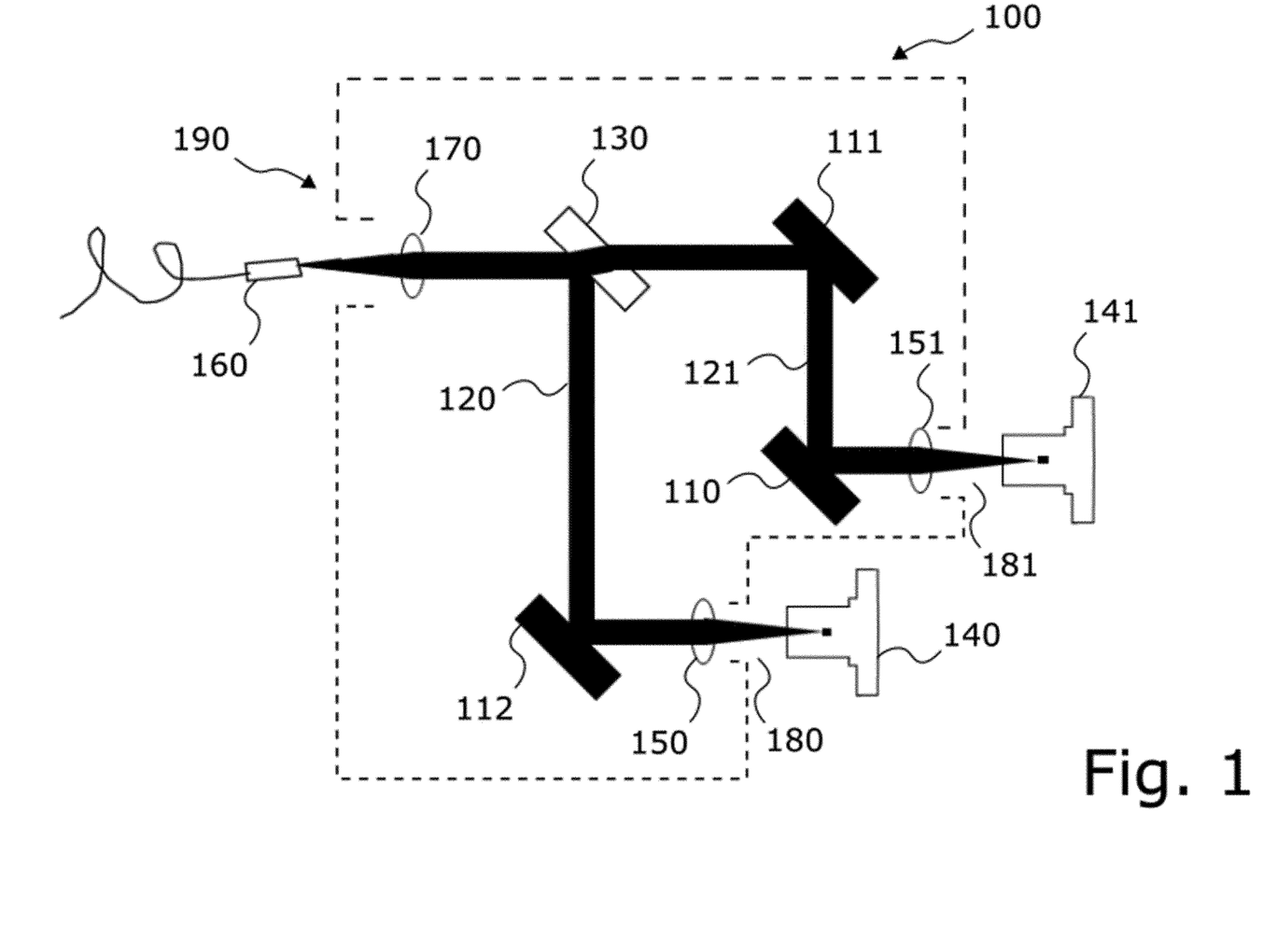
FIG. 1 schematically shows a top view of a system according to an embodiment of the present invention.

It is noted that each focussing lens performs a Fourier transformation of the beam cross section of the beam passing the lens. In case of an elliptical shape such a Fourier transformation essentially results in a rotation of the elliptical shape of 90°. Thus, for example, the lens 170 as shown in FIG. 1 rotates the elliptical shape of the optical beam 120, 121 comprising an elliptical cross section being oriented essentially parallel to the x-y-plane between the dichroic beam deflector 130 and the lens 170 such that the semi-major axis of the optical beam at the vicinity of the optical beam exit port 190/at the light receiver 160 is oriented along the z-direction as illustrated in FIG. 3d by the arrow next to the elliptical beam cross section 330.

It should be noted that "essentially or exactly elliptical" or "elliptical or at least essentially elliptical" is meant to describe an elliptical form which may vary as a result of interaction with optical elements, such as (dichroic) mirrors, optical lenses etc. The same applies to the expression "essentially or exactly circular" and to the definitions of "essentially or exactly parallel" and "essentially or exactly perpendicular". Further, deviations are allowed within typical tolerances.

Referring again to FIG. 3, an adhesive wedge between a lateral surface 312 of the beam deflector 310 and the base element 300 will only have a relevant influence if movement of the wedge results in a rotation of the beam deflector around the y'-axis (see FIG. 3c). As already discussed above, this will lead to a deflection of the beam in z-direction and thus to movement of the focal spot in z-direction on the light receiving element (see FIG. 3d). The beam deflector will almost never significantly rotate around the z-axis if the adhesive shrinks or expands. Bearing this understanding in mind, the elliptical shape of the laser beam cross section can even help to stabilise the laser coupling into the light receiver/fibre, if the beam is correctly oriented. By orienting the beam such that the semi-major axis of the elliptical cross section lies in the x-y-plane after having entered the optical beam entry port of the system, the focal spot of the optical beam will show its semi-major axis oriented parallel to the z-axis after having passed the exit port including a lens as shown in FIG. 3d. Thus, if the beam moves in z-direction, the circular light receiving cross section 340 will still be significantly illuminated due to the elongation of the elliptical focal spot 330 in this direction.

In an advantageous embodiment, the at least one optical beam entry port or every optical beam entry port comprises a collimator lens. According to an embodiment, the optical beam exit port comprises a lens performing a Fourier Transform, in particular a condenser lens. While the collimator lens generates a beam of parallel light bundles, the condenser lens focuses a beam of parallel light bundles into a focal spot. A coupling end of the light receiver/optical fibre should be located at this focal spot.

In another advantageous embodiment, the optical beam exit port is further configured to receive an optical fibre as the light receiver, such that an optical fibre can be mounted to the optical beam exit port. Similarly, it is advantageous if a laser, particularly a laser diode, can be mounted to an optical beam entry port.

Typically, the lateral surface of a beam deflector is essentially or exactly perpendicular to the deflection surface of the optical beam deflector for deflecting the optical beam.

Embodiments of the present invention are particularly advantageous for coupling two or more optical beams into a light receiver such as an optical fibre. In this case, at least one of the optical beam deflectors is a dichroic beam deflector which allows a first optical beam to pass through the dichroic beam deflector and deflects a second optical beam, e.g. due to the wavelength characteristic of the dichroic beam deflector. Such a dichroic beam deflector is particularly suited for superimposing two optical beams. In case of more than two optical beams, more than one dichroic beam deflectors may be used. Such a dichroic beam deflector is advantageously arranged for directing the first and the second optical beams to the optical beam exit port.

In an advantageous embodiment, at least the optical beam deflector which is located immediately before the optical beam exit port is directly fixed to the base element. Typically, the system is set up starting to adjust the beam deflectors in the direction from the entry port to the exit port. Any deviations of the preceding mirrors/beam deflectors can, to a certain degree, be balanced out by adjusting the beam deflector/dichroic beam deflector located immediately before the optical beam exit port correspondingly. To this end, hitherto the last beam deflector/dichroic beam deflector is usually provided with opto-mechanics, i.e. an adjustment device. With embodiments of the present invention, however, even these opto-mechanics can be rendered superfluous. In this context, it is particularly advantageous if each of the at least one optical beam deflector is directly fixed to the base element without using any opto-mechanics.

In a second aspect of the present invention, a method for coupling at least one optical beam into a light receiver is provided. The method for coupling at least one optical beam, each having an elliptical or at least essentially elliptical beam cross section into a light receiver having a circular or at least essentially circular light receiving cross section, comprises the steps of: providing at least one optical beam deflector for deflection of an optical beam of the at least one optical beam, and providing an optical base element, particularly extending in a plane, wherein at least one beam deflector of said at least one beam deflector is, after an orientation step for orienting the at least one beam deflector, directly fixed to the base element, particularly without an adjustment device allowing adjustment of the directly fixed deflection element after its fixation, wherein due to the fixation the respective directly fixed optical beam deflector is allowed—within a small range—to rotate around a rotation axis which rotation results in an additional (undesired) deflection of the corresponding optical beam, and orienting the semi-major axis of the elliptical cross section of the respective optical beam on a deflection surface of the respective optical beam deflector parallel or at least essentially parallel to the rotation axis, wherein the orientation step for orienting the at least one beam deflector comprises orienting the at least one optical beam deflector such that the elliptical cross section of the at least one optical beam overlaps the circular cross section of the light receiver.

In a preferred embodiment, the method comprises the steps of: providing at least one optical beam deflector for deflection of an optical beam of the at least one optical beam, and providing an optical base element extending in an x-y-plane, wherein at least one beam deflector of said at least one beam deflector is, after an orientation step for orienting the at least one beam deflector, directly fixed with a lateral surface of the beam deflector to the base element, such that a deflection surface of the beam deflector extends at least essentially perpendicular to the surface of the base element/x-y-plane, and orienting the semi-major axis of the elliptical cross section of the respective optical beam parallel or at least essentially parallel to the x-y-plane when striking/hitting the deflection surface of the respective optical beam deflector.

It is pointed out that the features described above in relation to the system according to the first aspect represent an analogous description of the corresponding features of the method according to the second aspect. Some or all of the method steps may be executed by (or using) a hardware apparatus, like for example, a processor, a microprocessor, a programmable computer or an electronic circuit. In some embodiments, one or more of the most important method steps may be executed by such an apparatus.

As used herein, the term "and/or" includes any and all combinations of one or more of the associated listed items and may be abbreviated as "/".

It should be noted that features of the above examples as well as of the examples explained below can—wholly or in part—be combined to other examples not explicitly mentioned herein, nevertheless being part of the present disclosure.

In FIG. 1, two optical beams 120, 121, each having an elliptical beam cross section are coupled into a light receiver 160 having a circular light receiving cross section. The system is designated 100. System 100 comprises two optical beam entry ports 180, 181, each port being configured to provide an entry for each of the optical beams 120 and 121 into the system 100. In the embodiment shown, optical beam entry port 180 comprises a collimator lens 150 and is configured for mounting a laser diode 140 for generating the optical beam 120. Same applies to optical beam entry port 181 which comprises a collimator lens 151 and is configured to receive a laser diode 141 for generating the optical beam 121.

The system 100 further comprises an optical beam exit port 190 configured to provide an exit for the merged two optical beams 120 and 121 out of the system 100 for coupling the beams into the light receiver 160 which is an optical fibre in the embodiment shown. The optical beam exit port 190 further comprises a condenser lens 170 and is further configured to receive the optical fibre 160. Usually, the system 100 comprises not only the elements shown e.g. in FIG. 1 as well as an optical base element preferably in the form of a base plate 300 (see e.g. FIG. 3 or 4), but also at least one side wall and in particular with a top cover element, such that the system may have a box-shape. The at least one optical beam entry port 180, 181 and the optical beam exit port 190 are in such a case formed in a side wall.

The system 100 further comprises a number of beam deflectors 110, 111, 112, and 130, e.g. fitted into corresponding frames or onto corresponding holders, for deflection of the optical beams 120, 121 in order to direct them to the optical beam exit port 190. Optical beam deflectors 110, 111, 112 may be in the form of simple mirrors, while beam deflector 130 may be a dichroic beam deflector which allows optical beam 121 to pass through it and which deflects optical beam 120 in order to merge the two optical beams 120, 121 onto the same optical path and preferably essentially propagating in a co-axially manner in the direction of the optical beam exit port 190.

System 100 may comprise further optical elements and may comprise more than two optical beam entry ports. A person skilled in the art may easily adapt system 100 to a system for coupling more than two optical beams into a light receiving element 160.

The system 100 further comprises an optical base element extending in an x-y-plane of the system, which plane corresponds to the drawing plane of FIG. 1. At least one beam deflector, especially the dichroic beam deflector 130 and advantageously also the mirrors 110, 111, 112, are directly fixed with a lateral surface to the base element. This is further described with regard to FIG. 3. The deflection surfaces of the fixed beam deflectors extend essentially or exactly perpendicular to the base element/drawing plane of FIG. 1. The such fixed beam deflectors are advantageously fixed via an adhesive. Alternatively or additionally, the fixing can be achieved by at least one screw and/or by welding.

System 100 may advantageously be set up in a factory, first aligning mirrors 110 and 111, second, aligning mirror 112 and finally aligning dichroic mirror 130 and fixing each of the aligned mirrors with an adhesive layer to the base element. The pre-built system 100 can then be delivered to a user without the need of a user alignment by means of opto-mechanics.

FIG. 2 shows an opto-mechanical holder or opto-mechanics 200 for a beam deflector typically used hitherto as an adjustment device for aligning and fixing a beam deflector. The mirror-mounting surface of the opto-mechanics 200 is designated 210. The opto-mechanics 200 comprises a ball bearing 220, a spring 240 and an adjustment screw 230. At least two supporting points of the mirror-mounting surface 210 can be moved back and forth by corresponding screws 230 with a fine thread. Thus, the vertical and horizontal tilt can be set independently. This allows a highly precise movement of the beam deflector. Such opto-mechanics 200 are high in costs and the alignment process is time consuming.

FIG. 3 schematically shows a beam deflector 310 directly fixed to an optical base element 300 as part of an embodiment of the system 100 shown in FIG. 1. The beam deflector 310 can be any one of the beam deflectors 110, 111, 112, 130 of FIG. 1. Beam deflector 310 is directly fixed with its lateral surface 312 to the base element 300 via an adhesive layer 314. As shown in FIG. 3a, the semi-major axis of the elliptical cross section 330 of the optical beam 320 is oriented parallel to the x-y-plane in which the optical base element 300 extends and in which the beam 320 travels in direction of the deflecting surface 311. Further details of FIGS. 3a to 3d have already been discussed above. As already explained above, the fixing process and any possible thermal changes afterwards may lead to mirror movements. While movements around a z-axis are very unlikely, movements around an x-axis are not relevant for the coupling efficiency. The only relevant movement is the movement around the y'-axis as shown in FIG. 3c. Such a movement leads to a deflection of the reflected beam 320 out of the x-y-plane, which results in a movement of the focal spot 330 in the z-direction as shown in FIG. 3d. As long as the elliptical cross section 330 of the optical beam 320 overlaps the circular cross section 340 of the optical fibre 160, a movement of the semi-major axis along the z-direction hardly influences the coupling efficiency.

Figure 4:
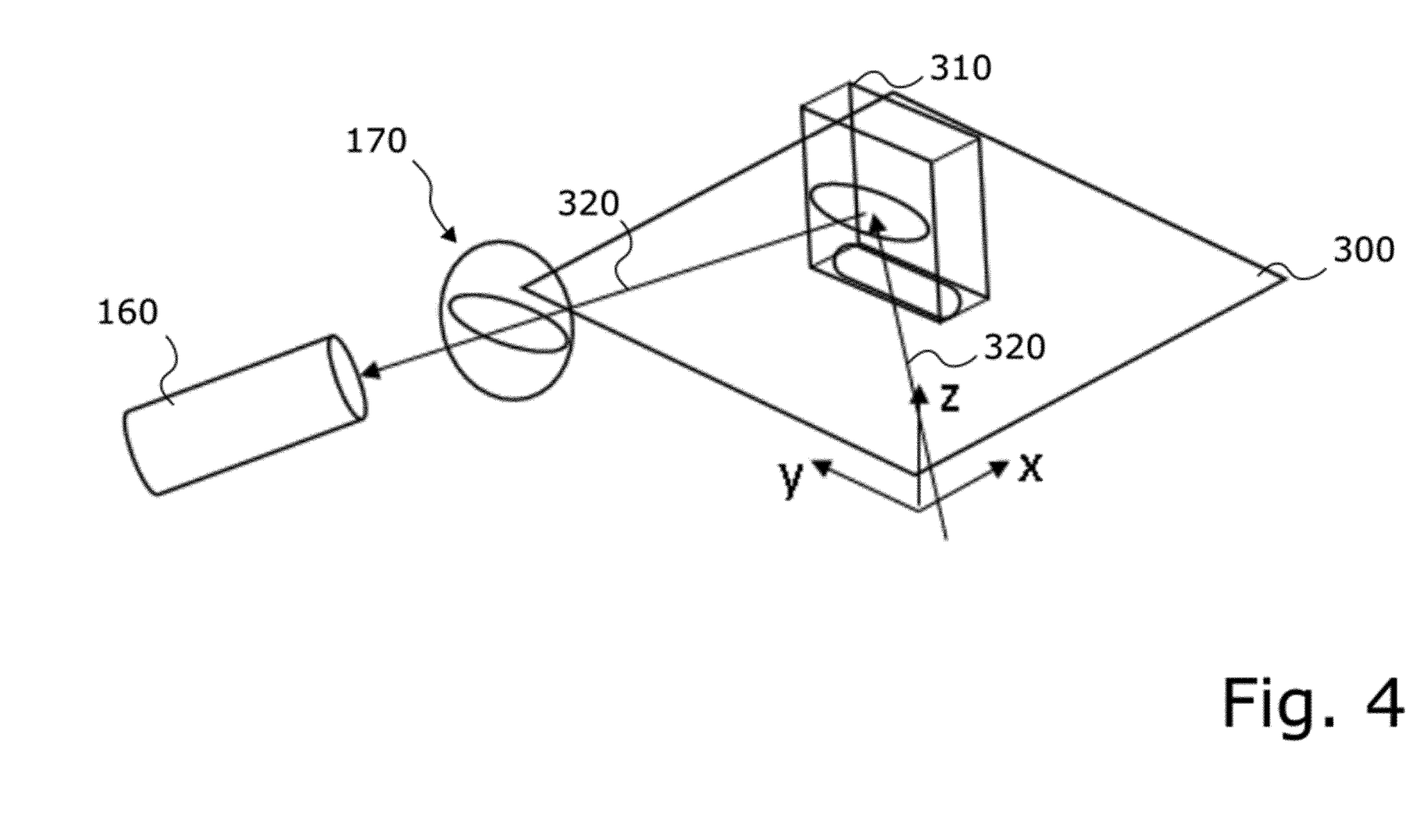
FIG. 4 schematically shows a perspective view of a part of a system shown in FIG. 1 together with a light receiver according to an embodiment of the present invention.

FIG. 4 schematically shows in a perspective view e.g. a part of a system shown in FIG. 1 together with a light receiver 160 according to an embodiment of the present invention. The optical beam deflector 310 can be a mirror especially in case of only one beam being coupled into a light receiver, or can be a dichroic beam deflector in case of coupling two or more optical beams into a light receiver (as shown in FIG. 1 for two optical beams). In the latter case, optical beam 320 in FIG. 4 corresponds to the optical beam 120 in FIG. 1 and the beam deflector 310 corresponds to the dichroic beam deflector 130 of FIG. 1. Again, the arrows 320 illustrate the laser beam propagation directions and the elliptical shapes illustrate the corresponding beam cross sections. The optical beam 320, after being reflected by the beam deflector 310, is directed to the condenser lens 170, the elliptical illuminated area being shown in FIG. 4 (on the surface of the beam deflector 310 and at a side of the condenser lens 170 facing the beam deflector 310). The condenser lens 170 focuses the beam onto the front side of the light receiver, here an optical fibre 160 which is arranged with its front side in the focal plane of lens 170. This arrangement results in coupling of the optical beam having an elliptical beam shape 330 into the optical fibre 160 having a circular light receiving section 340 as shown in FIG. 3d. The elliptical shape of the optical beam 320 between the beam deflector 310 and the condenser lens 170 is oriented with its semi-major axis essentially parallel to the x-y-plane. Lens 170 turns the elliptical shape of the optical beam 320 about 90 degrees by the Fourier Transform function of the lens 170, thus resulting in a (focused) elliptical shape of the optical beam 320 whose semi-major axis is oriented essentially parallel to the z-axis (as shown in FIG. 3d).

As can be seen from, for example, FIGS. 3a and 4, it should be made sure that the mirror dimension in the y-direction or more generally the mirror breadth is sufficient to cover the elliptical beam shape to its full extent. As the semi-major axis of the elliptical beam shape is oriented parallel to the x-y-plane, the semi-major axis is enlarged on the mirror surface, if the beam hits the mirror non-perpendicularly. (For illustration purposes, e.g., a circular beam profile would generate an elliptical illuminated area on a mirror surface, if the beam hits the mirror non-perpendicularly.) Thus, according to an embodiment of the present invention, an elliptical beam profile with its semi-major axis parallel to the x-y-plane may need a mirror with a larger dimension in the y-direction (as shown in FIGS. 3a and 4), a fact which would normally prevent a person skilled in the art from choosing such a beam profile orientation and would rather lead to choosing a preferred orientation of the semi-major axis parallel to the z-direction. As explained above, however, the present embodiment offers significant advantages such as a better light coupling stability.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 system
110 beam deflector, mirror
111 beam deflector, mirror
112 beam deflector, mirror
130 beam deflector, dichroic beam deflector
120 optical beam
121 optical beam
140 laser diode
141 laser diode
150 collimator lens
151 collimator lens
160 light receiver, optical fibre
170 condenser lens
180 optical beam entry port
181 optical beam entry port
190 optical beam exit port
200 opto-mechanical holder, opto-mechanics
210 mirror-mounting surface
220 ball bearing
230 adjustment screw
240 spring
300 optical base element, base plate
310 optical beam deflector, mirror, dichroic beam deflector 311 deflecting surface
312 lateral surface
313 backside
314 adhesive layer, adhesive
320 optical beam
330 elliptical cross section
340 circular cross system

The invention claimed is:

1. A system for coupling at least one optical beam, each having an essentially or exactly elliptical beam cross section into a light receiver having an essentially or exactly circular light receiving cross section, the system comprising
at least one optical beam entry port, each configured to provide an entry for each of the at least one optical beams into the system;
an optical beam exit port configured to provide an exit for the at least one optical beam out of the system for coupling the at least one optical beam into the light receiver, the optical beam exit port comprising a lens configured to perform a Fourier Transform;
at least one optical beam deflector for deflection of an optical beam of the at least one optical beam; and
an optical base element, at least one of the at least one beam deflector being directly fixed to the base element,
wherein due to being fixed, the at least one directly fixed optical beam deflector is allowed to rotate around a rotation axis which rotation results in an additional deflection of the corresponding optical beam,
wherein the corresponding at least one optical beam and/or its assigned optical beam entry port is further configured such that the semi-major axis of the elliptical cross section of the optical beam on a deflection surface of a respective optical beam deflector is oriented essentially or exactly parallel to the rotation axis,
and wherein the at least one optical beam deflector is oriented such that, after having passed the optical beam exit port, the elliptical cross section of the at least one optical beam overlaps the circular cross section of the light receiver.

2. The system of claim 1, wherein the optical base element extends in an x-y-plane of the system, the at least one directly fixed beam deflector is fixed with a lateral surface of the beam deflector to the base element, and the corresponding optical beam and/or its assigned optical beam entry port is further configured such that the semi-major axis of the elliptical cross section of the optical beam on the deflection surface of the respective optical beam deflector is oriented essentially or exactly parallel to the x-y-plane.

3. The system of claim 1 having more than one optical beam entry port for providing entry of more than one optical beam into the system, wherein at least one of the at least one beam deflectors is a dichroic beam deflector for allowing a first optical beam of the optical beams to pass through the dichroic beam deflector and for deflecting a second optical beam of the optical beams.

4. The system of claim 3, wherein the dichroic beam deflector is arranged for directing the first and the second optical beams to the optical beam exit port.

5. The system of claim 1, wherein at least the optical beam deflector located immediately before the optical beam exit port is directly fixed to the base element.

6. The system of claim 1, wherein each of the at least one optical beam deflector is directly fixed to the base element.

7. The system of claim 1, wherein the at least one beam deflector is directly fixed via an adhesive and/or with the help of at least one screw and/or via welding to the base element.

8. The system of claim 2, wherein the lateral surface is essentially or exactly perpendicular to the deflection surface of the respective optical beam deflector for deflecting the optical beam.

9. The system of claim 1, wherein the at least one optical beam entry port is further configured for mounting a respective laser for generating the respective optical beam to the system.

10. The system of claim 1, wherein the at least one optical beam entry port comprises a collimator lens.

11. The system of claim 1, wherein the optical beam exit port is further configured to receive an optical fiber as the light receiver.

12. The system of claim 1, wherein the lens configured to perform a Fourier Transform is or comprises a condenser lens.

13. The system of claim 1, wherein at least one beam deflector of the at least one beam deflector is directly fixed to the base element without an adjustment device allowing adjustment of the directly fixed optical beam deflector after its fixation.

14. A method for coupling at least one optical beam, each having an elliptical or at least essentially elliptical beam cross section into a light receiver having a circular or at least essentially circular light receiving cross section, the method comprising the steps of:
providing at least one optical beam deflector for deflection of an optical beam of the at least one optical beam, providing a lens for focusing the deflected optical beam and for performing a Fourier Transform;
providing an optical base element,
wherein at least one of the at least one beam deflector is, after an orientation step for orienting the at least one beam deflector, directly fixed to the base element, wherein due to being fixed, a respective at least one directly fixed optical beam deflector is allowed to rotate around a rotation axis which rotation results in an additional deflection of the corresponding optical beam; and
orienting a semi-major axis of the elliptical cross section of a respective optical beam on a deflection surface of the respective optical beam deflector parallel or at least essentially parallel to the rotation axis,
wherein the orienting the at least one beam deflector comprises orienting the at least one optical beam deflector such that the elliptical cross section of the at least one optical beam overlaps the circular cross section of the light receiver.

* * * * *